United States Patent
Yu et al.

(10) Patent No.: US 8,988,201 B2
(45) Date of Patent: Mar. 24, 2015

(54) PARAMETER SETTING METHOD OF TIRE MONITOR

(71) Applicant: Orange Electronic Co., Ltd., Taichung (TW)

(72) Inventors: Hung Chih Yu, Taichung (TW); Yung Hsing Liu, Taichung (TW)

(73) Assignee: Orange Electronic Co., Ltd., Taichung (TW)

( * ) Notice: Subject to any disclaimer, the term of this patent is extended or adjusted under 35 U.S.C. 154(b) by 145 days.

(21) Appl. No.: 13/735,336

(22) Filed: Jan. 7, 2013

(65) Prior Publication Data
US 2014/0070928 A1    Mar. 13, 2014

(30) Foreign Application Priority Data
Sep. 7, 2012 (TW) .............................. 101132650 A

(51) Int. Cl.
G05B 11/01 (2006.01)
G08C 19/00 (2006.01)
B60C 23/00 (2006.01)

(52) U.S. Cl.
CPC ................ *G08C 19/00* (2013.01); *B60C 23/00* (2013.01)

USPC ...................................................... 340/12.23

(58) Field of Classification Search
CPC ............ B60C 23/0408; B60C 23/0435; B60C 23/0438
USPC ........ 340/12.23, 10.1, 447, 442, 449; 73/146; 701/36; 307/10.1
See application file for complete search history.

(56) References Cited

U.S. PATENT DOCUMENTS

| 8,736,435 B2 * | 5/2014 | Kanenari ....................... 340/447 |
| 2009/0199629 A1 * | 8/2009 | Matsumura ................... 73/146.4 |

\* cited by examiner

*Primary Examiner* — Vernal Brown
(74) *Attorney, Agent, or Firm* — Wang Law Firm, Inc.; Li K. Wang; Stephen Hsu

(57) ABSTRACT

A parameter setting method of a tire monitor is applied in a setter for setting a parameter of the tire monitor via a cable or wireless transmission, and the method includes the steps of using a setter to transmit a change signal for changing a condition value of at least one parameter in the monitor; using the monitor to receive the change signal; updating the condition value of the corresponding parameter according to the change signal; and using the monitor to transmit a monitor signal according to an updated parameter format, so as to update the parameters of the tire monitor quickly.

9 Claims, 7 Drawing Sheets

PARAMETER SETTING METHOD OF TIRE MONITOR

CROSS-REFERENCE TO RELATED APPLICATION

This application claims priority to TW 101132650, filed on Sep. 7, 2012 in the Intellectual Property Office of Taiwan, R.O.C., the specification of which is incorporated in its entirety by reference.

FIELD OF THE INVENTION

The present invention relates to a tire monitor, in particular to a setting method for updating each parameter in the tire monitor quickly.

BACKGROUND OF THE INVENTION

In general, a tire monitor is installed in a tire for detecting the using conditions including information such as a tire pressure and a tire temperature status of the tire, and further transmitting the information to a console or a monitor of a car via wireless transmissions, so that a driver can control the use conditions of the tire to reduce the probability of accidents.

In the monitor, a set of parameter format comprised of various different parameters (such as the characteristics including pressure, temperature, verification code, or communication format) is used for representing the format setting of the monitor and its transmitted signal, and each parameter has a condition value for defining the parameter. However, the control programs of the monitor and the console or monitor of the car must be compatible. Unfortunately, there are various different models of cars and various brands of the consoles or monitors of these cars and different and model numbers are introduced from time to time, so that the monitor usually stores a large number of parameters and condition values. Particularly, the after-sale service market of the tire pressure monitor and the original manufacturer substitute part market usually have to modify or update the parameters and condition values in the monitor according to the actual control program of a console or a monitor of a corresponding car model, before they can replace the old monitor with a new one.

However, the conventional monitor generally has plural sets of parameter formats stored therein and provided for users to select and use, and the monitors of this sort require more memory spaces and the parameter format included in the conventional monitor may not be applicable for the practical use. As a result, such monitors cannot be used since there is no way of writing in data. Another conventional monitor as disclosed in U.S. Pat. No. 7,518,495B2 allows users to write in a brand new parameter format to fit various different car models and their consoles or monitors, but it is necessary to update the whole set of parameter formats for each time of use of the monitor, and the conventional monitor cannot update parameters with differences, thus having a drawback of consuming much setup time.

SUMMARY OF THE INVENTION

In view of the aforementioned problems, it is a primary objective of the present invention to provide a parameter setting method of a tire monitor, and the method allows users to update the parameters that require updates, so as to shorten the setup time of the monitor.

To achieve the foregoing objective, the present invention provides a parameter setting method of a tire monitor, and the method is applied to a setter for setting a parameter of a tire monitor via cable or wireless transmission, and the method comprises the following steps:

A setter transmits a change signal for changing a condition value of at least one parameter included in the monitor.

The monitor receives the change signal.

The monitor updates the condition value of the corresponding parameter according to the change signal.

Finally, the monitor transmits a monitor signal according to a changed parameter format.

If there are two or more parameters with a difference, the method further includes the following setting methods.

1. The setter sequentially transmits a change signal for changing a condition value of two or more parameters included in the monitor, and the monitor updates the condition value of the corresponding two or more parameters according to the change signal.

2. The setter sequentially transmits at least one change signal for changing a condition value of different parameters included in the monitor, and the monitor updates the corresponding parameters according to the change signals.

DESCRIPTION OF THE PREFERRED EMBODIMENTS

The technical characteristics of the present invention will become apparent with the detailed description of the preferred embodiments accompanied with the illustration of related drawings as follows.

The present invention relates to a parameter setting method of a tire monitor, wherein tire monitor includes a set of complete parameter format stored therein and comprised of a plurality of parameters, and the complete parameter format represents a format setting of a monitor and its transmitted signal, and each parameter has a condition value that defines the parameter. The present invention updates the parameters and the condition values in the monitor by an external setter, wherein the setter includes a plurality of parameters stored therein, and each parameter has one or more condition values, and the setter transmits the parameters to the monitor via cable or wireless transmissions for the update, and the method is described as follows.

Figure 1:
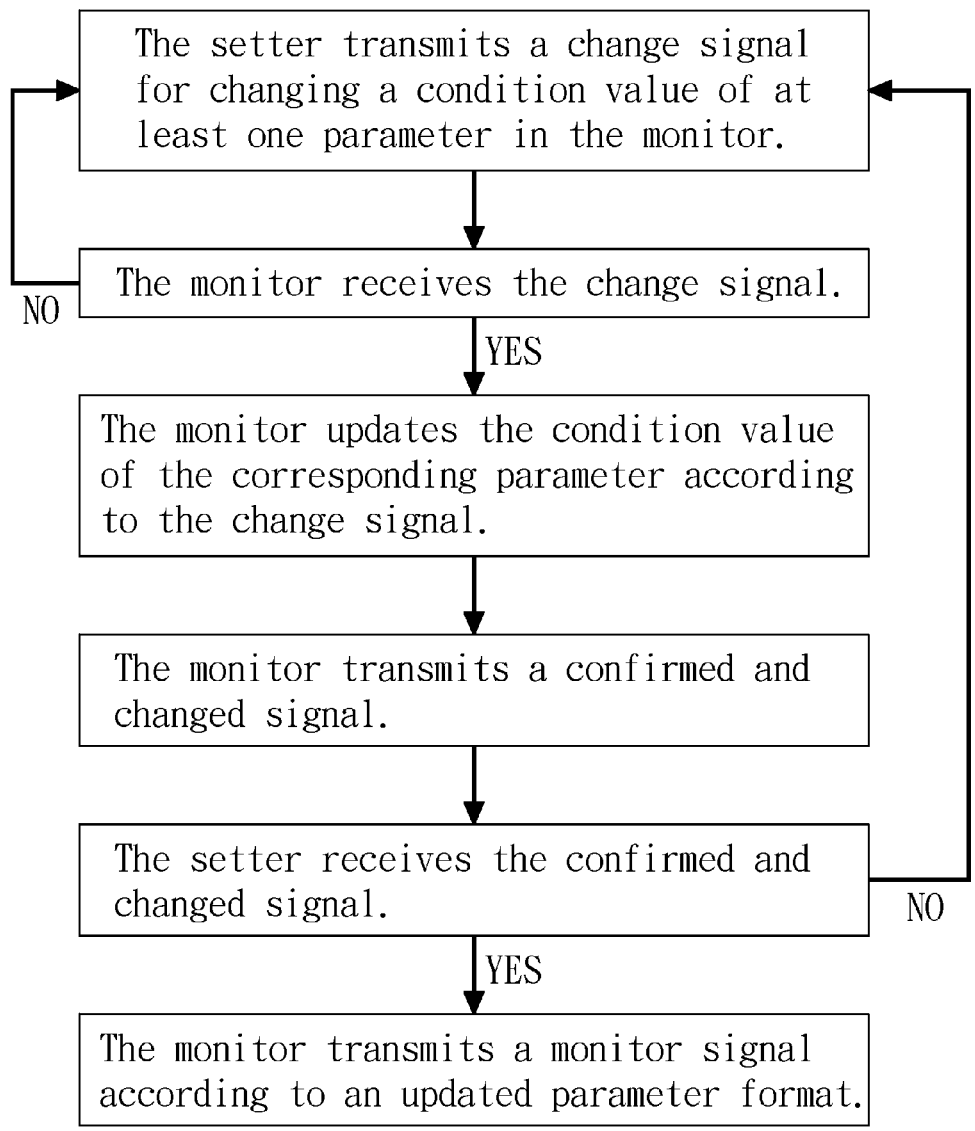
FIG. 1 is a flow chart of a parameter setting method of the present invention.

With reference to FIG. 1 for the flow chart of a parameter setting method of a tire monitor in accordance with the present invention, the method comprises the following steps:

The setter transmits a change signal for changing a condition value of at least one parameter in the monitor.

The monitor receives the change signal.

The monitor updates the condition value of the corresponding parameter according to the change signal.

The monitor transmits a confirmed and changed signal.

The setter receives the confirmed and changed signal.

Finally, the monitor transmits a monitor signal according to an updated parameter format.

Figure 2:
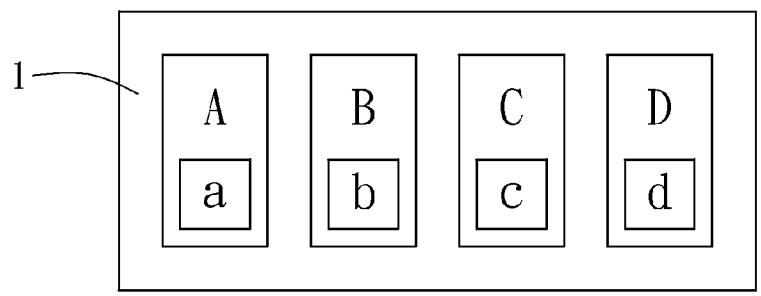
FIGS. 2 to 4 are schematic views of a process of updating a parameter in a monitor in accordance with the present invention.
Figure 3:
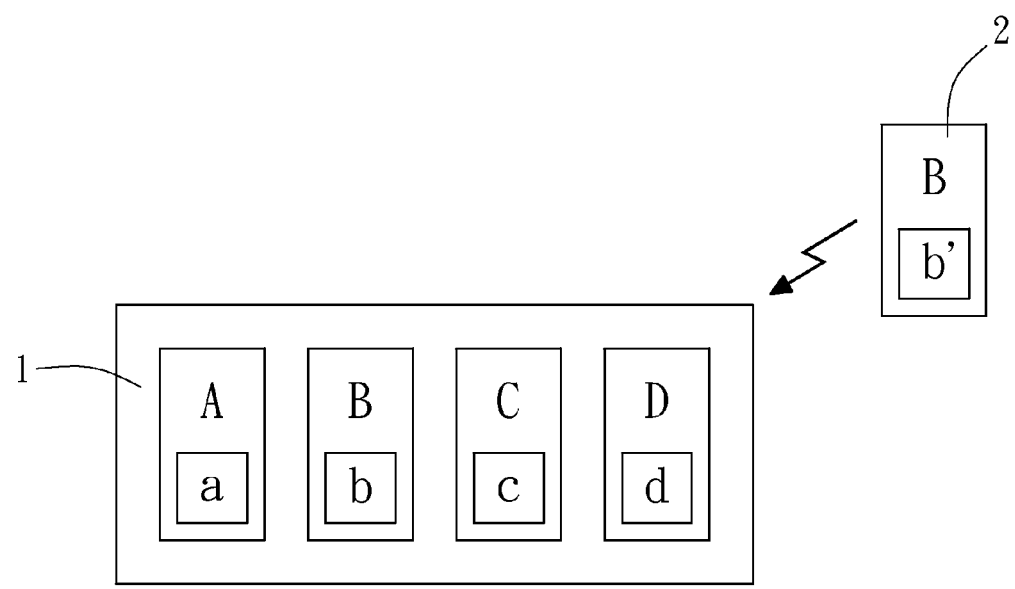
Figure 4:
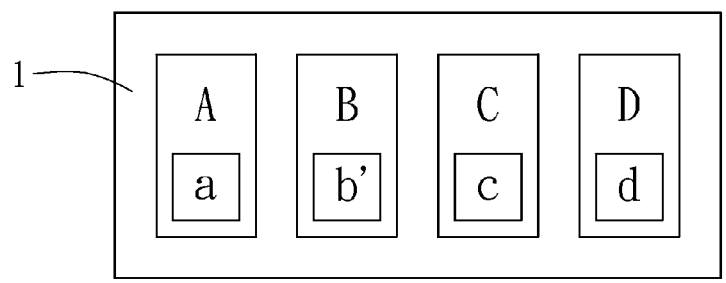

With reference to FIGS. 2 and 4, four parameters A, B, C, D are stored in a monitor 1 as shown in FIG. 2, and the four parameters are used for the purpose of illustrating the present invention only, but the invention is not limited to the quantity of four only), wherein each parameter has a condition value a, b, c, d, and the monitor 1 transmits a monitor signal according to the complete parameter format (a-b-c-d). In FIG. 3, a user uses a setter (not shown in the figure) to transmit a change signal 2 to the monitor 1, wherein the change signal 2 has a condition value b' including an instruction for changing the parameter B. After the monitor 1 receives the change signal 2 as shown in FIG. 4, the condition value b of the parameter B is updated to b' according to the change signal, and then after the changes made by the monitor 1 and the setter are confirmed to be completed, the monitor 1 transmits a monitor signal according to the new parameter format (a-b'-c-d).

If it is necessary to change or update two or more parameters (and two parameters are changed in this preferred embodiment), at least the following two exemplary modes may be used.

Figure 5:
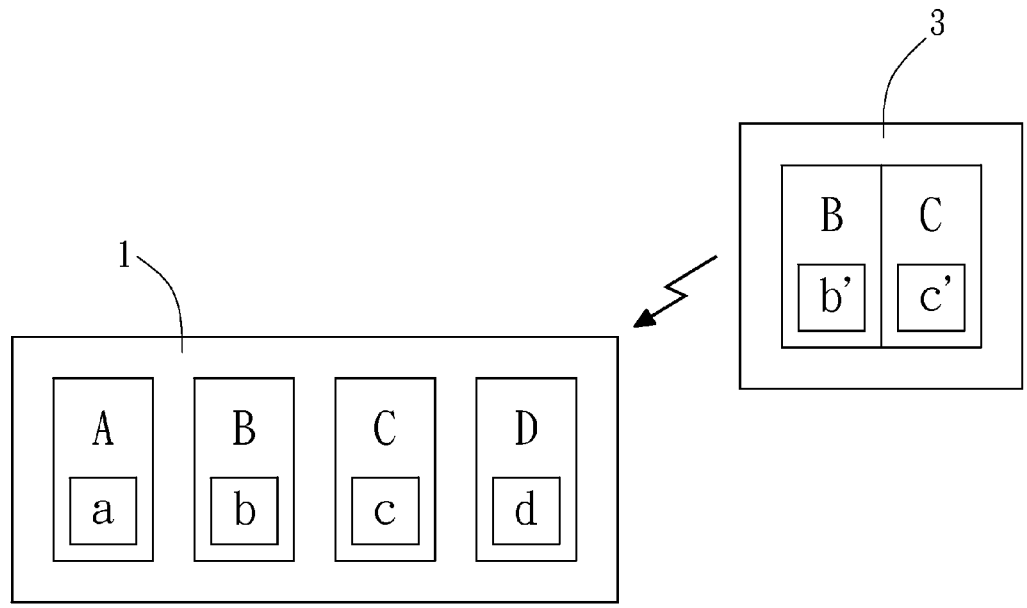
FIGS. 5 and 6 are schematic views of a process of updating two parameters in a monitor in accordance with a first preferred embodiment of the present invention.
Figure 6:
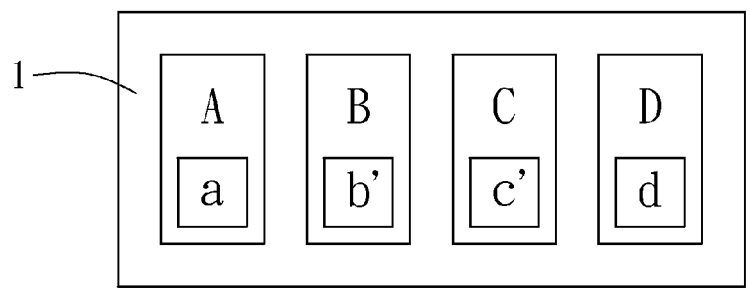

1. A user transmits a change signal 3 to the monitor 1 through the setter as shown in FIG. 5, wherein the change signal 3 includes instructions for changing the condition values b' and c' of the parameters B and C respectively. After the monitor 1 receives the change signal 3 as shown in FIG. 6, the condition values b, c of the parameters B and C are changed to b', c' according to the change signal, and then after the changes made by the monitor 1 and the setter are confirmed to be completed, the monitor 1 transmits a monitor signal according to the new parameter format (a-b'-c'-d).

Figure 7:
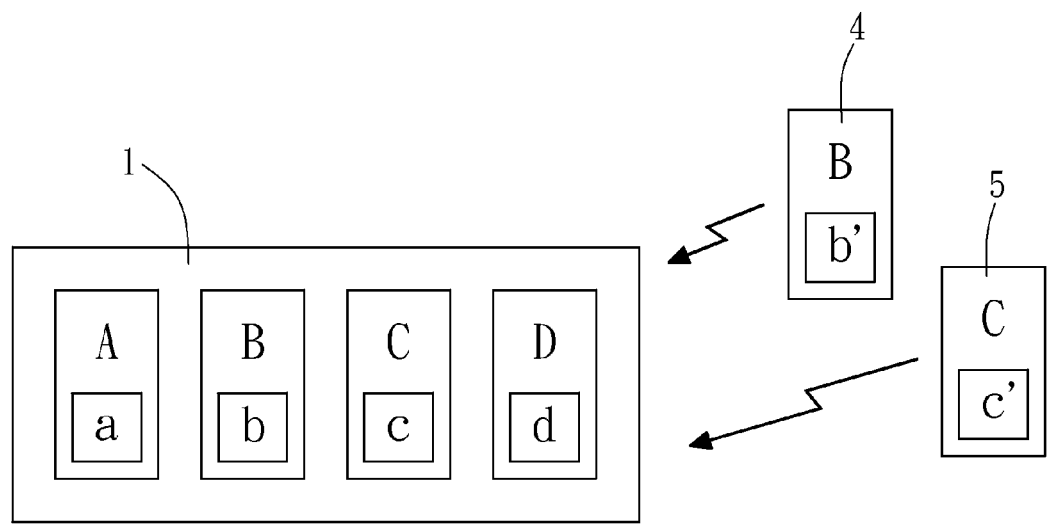
FIGS. 7 to 9 are schematic views of a process of updating two parameters in a monitor in accordance with a second preferred embodiment of the present invention.
Figure 8:
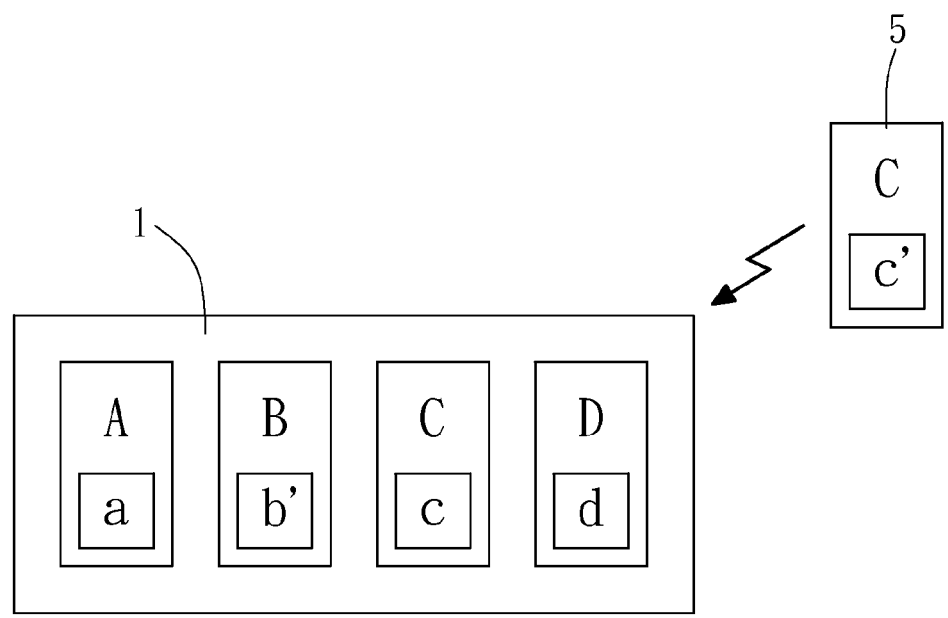
Figure 9:
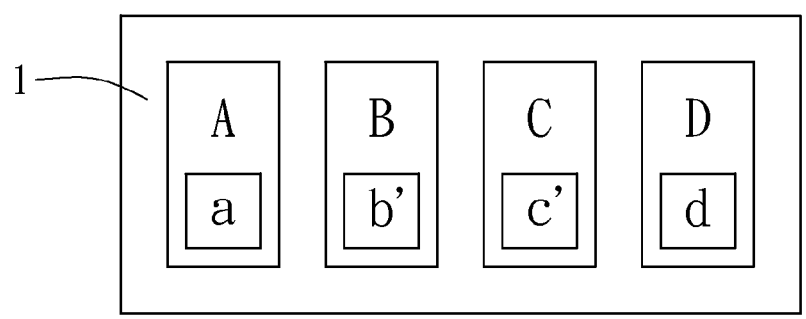

2. The user transmits two change signals 4, 5 to the monitor 1 sequentially by the setter as shown in FIG. 7, wherein one of the change signals 4 contains an instruction for changing the condition value b' of the parameter B, and the other one of the change signals 5 contains an instruction for changing the condition value c' of the parameter C. When the monitor 1 receives the change signal 4 as shown in FIG. 8, the condition value b of the parameter B is updated to b' according to the change signal, and when the monitor 1 further receives the change signal 5 as shown in FIG. 9, the condition value c of the parameter C is updated to c'. After the changes made by the monitor 1 and the setter are confirmed to be completed, the monitor 1 transmits a monitor signal according to a new parameter format (a-b'-c'-d).

In the procedures of the parameter setting method of a tire monitor in accordance with the present invention, the two steps including the steps of transmitting the updated signal by the monitor and receiving the updated signal by the setter provide a measure for the users to confirm whether or not the monitor has received the change signal and the corresponding condition value has been updated according to the change signal. If yes, then the monitor will be able to transmit a monitor signal according to the updated parameter format, or else it is necessary to transmit a change signal for changing the condition value of at least one parameter in the monitor by the setter, and then execute the parameter setting method of the tire monitor in accordance with the present invention again. If the two steps of transmitting the updated signal by the monitor and receiving the updated signal by the setter provide a measure for the users to confirm whether or not the monitor has received the change signal and the corresponding condition value has been updated according to the change signal are not executed, the parameter setting method of a tire monitor of the present invention still can confirm wither the method is carried out by other measures.

In the parameter setting method of a tire monitor, the required changing parameter and condition value in the monitor are determined by a comparison means of the setter and embedded into the change signal, and then transmitted to the monitor, so that the monitor can update the parameter with a difference and its condition value of one or more parameter formats instead of the conventional way of updating the whole set of parameter formats by the monitor, so as to shorten the setup time of the monitor. Wherein, the comparison means compares the parameters with a difference in the setter and the monitor and their condition values. For example, the comparison means can be implemented by the following two methods.

Figure 10:
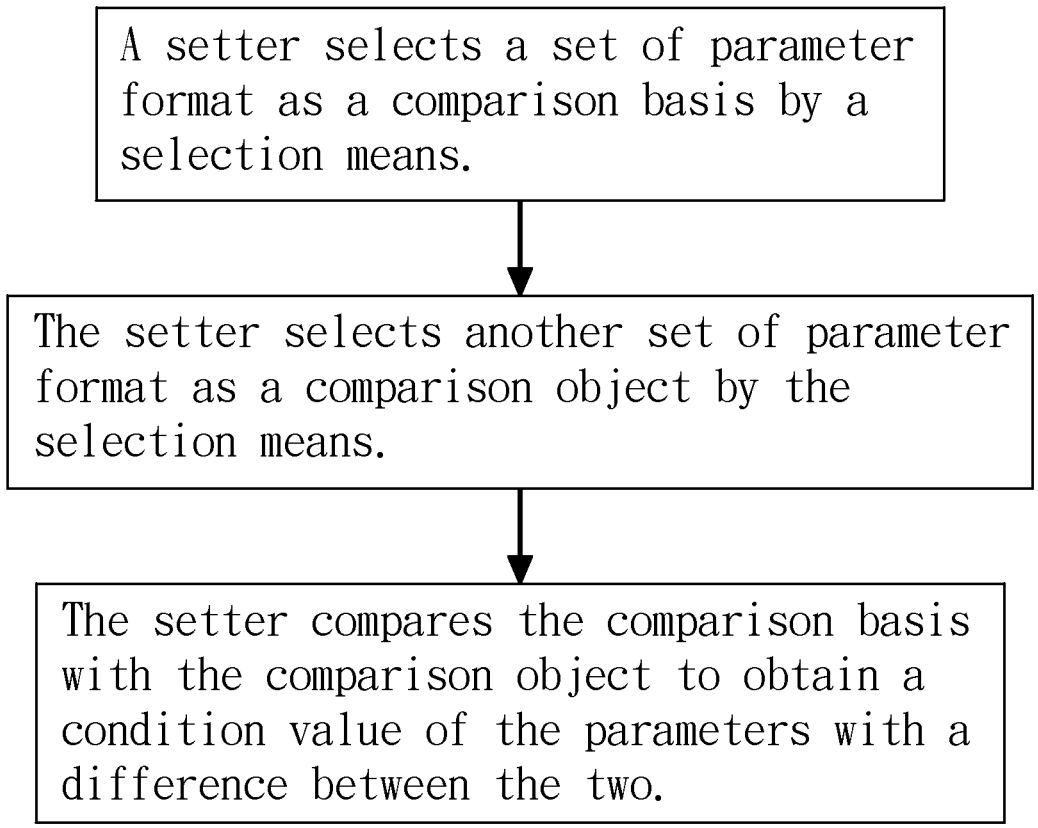
FIG. 10 is a flow chart of a comparison means by a setter in accordance with the first preferred embodiment of the present invention.

1. The comparison means as shown in FIG. 10 is operated by the procedure comprising the flowing steps:

Use a setter to select a set of parameter format as a comparison basis through a selection means.

Use the setter to select another set of parameter format as a comparison object through the selection means.

Finally, the setter compares the parameter format serving as the comparison basis with the parameter format serving as the comparison object to find a condition value of the parameter with a difference between the two parameter formats.

In this method, the selection means can make a selection through an input interface of the setter. Firstly, a set of parameter format including the parameters A, B, C, D each having a condition value a, b, c, d respectively and originally stored in the monitor is selected by the input interface of the setter, and then another set of desired updating parameter format including the parameters A, B, C, D each having a condition value a, b', c, d respectively, and then the setter compares the parameter B with a difference between the two through the comparison means, and the condition value is b', and the parameter B and its condition value b' are embedded into a change signal which is transmitted to the monitor, so that the monitor can update the parameter format according to the change signal.

Figure 11:
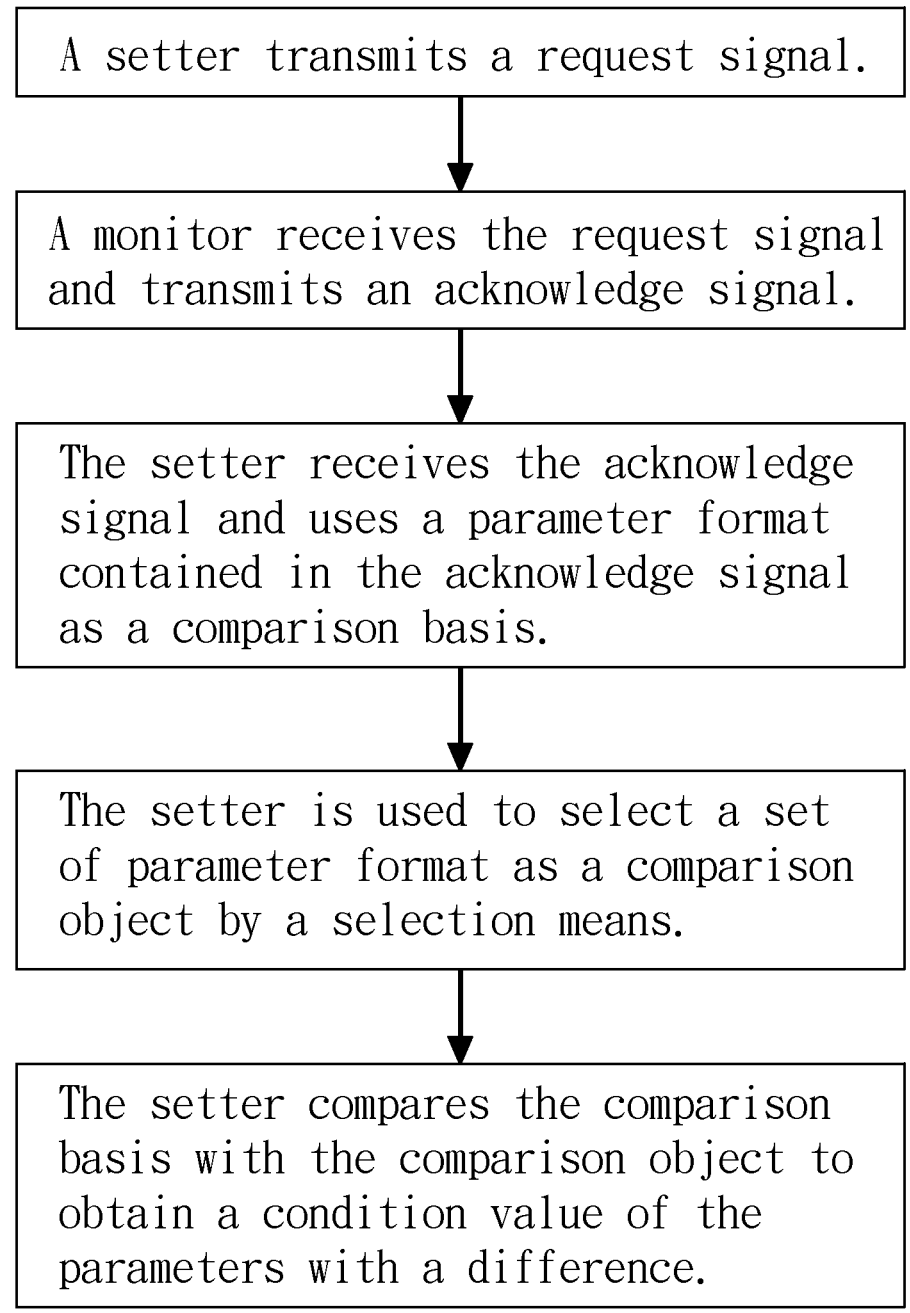
FIG. 11 is a flow chart of a comparison means by a setter in accordance with the second preferred embodiment of the present invention.

2. The comparison means as shown in FIG. 11 is operated by the procedure comprising the flowing steps:

The setter transmits a request signal.

The monitor receives the request signal and transmits an acknowledge signal, wherein the acknowledge signal contains a parameter format in the monitor.

The setter receives the acknowledge signal and uses the parameter format contained therein as a comparison basis.

The setter is used for selecting a set of parameter format as a comparison object by a selection means.

The setter compares the parameter format serving as the comparison basis with the parameter format serving as the comparison object to obtain a condition value of the parameter with a difference.

In this method, the parameter format is obtained from the monitor by the setter via a signal transmission method, so as to obtain the parameter format automatically without manually selecting it by the users, and then the input interface of the setter is provided for selecting a set of desired updating parameter format, and then the difference between the two parameter formats are compared to obtain the desired updating parameter and its condition value, and the parameter and condition value are embedded into a change signal which is transmitted to the monitor, so that the monitor can update the parameter format according to the change signal.

What is claimed is:

1. A parameter setting method of a tire monitor, applied in a setter to set a parameter of the tire monitor via a cable or wireless transmission, and the tire monitor having a set of complete parameter formats comprised of a plurality of parameters, and each parameter having a condition value, and the method comprising the steps of:
   transmitting, by the setter, a change signal for changing a condition value of at least one parameter in a monitor;
   receiving, by the monitor, the change signal;
   updating, by the monitor, the condition value of the corresponding parameter according to the change signal; and
   transmitting, by the monitor, a monitor signal according to an updated parameter format,
   wherein the plurality of parameters comprise a communication format between the tire monitor and the setter.

2. The parameter setting method of a tire monitor according to claim 1, wherein after the monitor updates the condition value of the corresponding parameter according to the change signal, the method further comprises the steps of: transmitting the confirmed and changed signal by the monitor; and receiving the confirmed and changed signal by the setter.

3. The parameter setting method of a tire monitor according to claim 1, wherein the setter transmits a change signal for changing the condition value of two or more parameters in the monitor, and the monitor updates the corresponding condition values of the two or more parameters according to the change signal.

4. The parameter setting method of a tire monitor according to claim 1, wherein the setter transmits change at least one signal of the condition values of different parameters in the monitor, and the monitor updates the condition values of the corresponding parameters according to the change signals sequentially.

5. The parameter setting method of a tire monitor according to claim 1, wherein the setter determines a desired updating parameter and a condition value thereof by a comparison means and embeds the parameter and the condition value into the change signal.

6. The parameter setting method of a tire monitor according to claim 5, wherein the comparison means includes performs a procedure comprising the steps of: using the setter to select a set of parameter format by a selection means as a comparison basis; using the setter to select another set of parameter format by the selection means as a comparison object; and using the setter to compare the parameter format serving as the comparison basis with the parameter format serving as the comparison object to obtain the condition values of the parameters with a difference between the two parameter formats.

7. The parameter setting method of a tire monitor according to claim 5, wherein the comparison means performs a procedure comprising the steps of:
   using the setter to transmit a request signal;
   receiving the request signal and transmitting an acknowledge signal by the monitor, wherein the acknowledge signal includes a parameter format in the monitor;
   receiving the acknowledge signal by the setter and using the parameter format of the acknowledge signal as a comparison basis;
   using the setter to select a set of parameter format as a comparison object through a selection means; and using the setter to compare the parameter format serving as the comparison basis with the parameter format serving as the comparison object to obtain a condition value of the parameters with a difference between the two parameter formats.

8. The parameter setting method of a tire monitor according to claim 7, wherein the selection means performs a selection through an input interface of the setter.

9. The parameter setting method of a tire monitor according to claim 1, wherein the setter includes a plurality of parameters stored therein, and each parameter has one or more condition values.

\* \* \* \* \*